(12) United States Patent
Kaufman

(10) Patent No.: US 6,581,369 B1
(45) Date of Patent: Jun. 24, 2003

(54) HEAT RECOVERY IN TEST CELLS FOR GAS TURBINE ENGINES

(75) Inventor: Richard Dana Kaufman, Peabody, MA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/939,933

(22) Filed: Aug. 27, 2001

(51) Int. Cl.⁷ .................................................. F02C 7/24
(52) U.S. Cl. .............................. 60/204; 60/772; 60/39.5
(58) Field of Search ........................ 60/204, 772, 39.5; 73/117.4

(56) References Cited

U.S. PATENT DOCUMENTS

| | | | |
|---|---|---|---|
| 2,692,024 A | * 10/1954 | Burdett | 181/221 |
| 4,106,286 A | * 8/1978 | Sakai et al. | 60/39.182 |
| 5,896,740 A | 4/1999 | Shouman | 60/39.182 |
| 6,065,283 A | 5/2000 | Shouman | 60/39.182 |
| 6,200,128 B1 | 3/2001 | Kobayashi | 431/5 |
| 6,254,334 B1 | 7/2001 | LaFleur | 415/115 |
| 6,263,664 B1 | 7/2001 | Tanigawa et al. | 60/39.54 |

* cited by examiner

*Primary Examiner*—Ehud Gartenberg
(74) *Attorney, Agent, or Firm*—David L. Narciso; Gregory A. Welte

(57) ABSTRACT

A heat recovery system. Gas turbine engines are tested in test cells. Exhaust from the engines is ducted into an exhaust pipe which is vented to the atmosphere. To prevent heat in the exhaust from damaging the exhaust pipe, cooling water is sprayed into the pipe. The cooling water is boiled into steam, which is also vented to the atmosphere. The invention recovers heat from the cooling water, as opposed to losing the heat to the atmosphere in the form of steam.

14 Claims, 4 Drawing Sheets

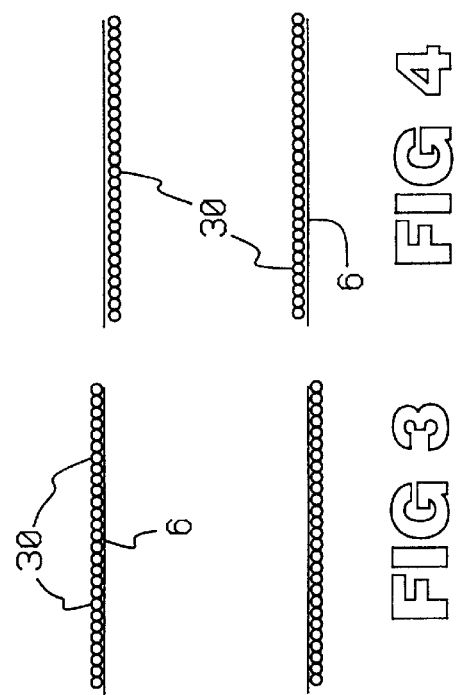
FIG 1 PRIOR ART
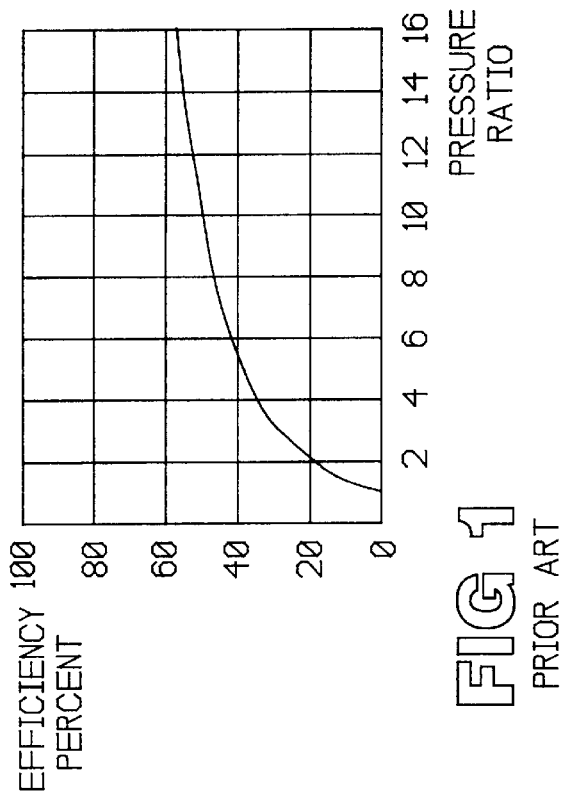
FIG 2 PRIOR ART
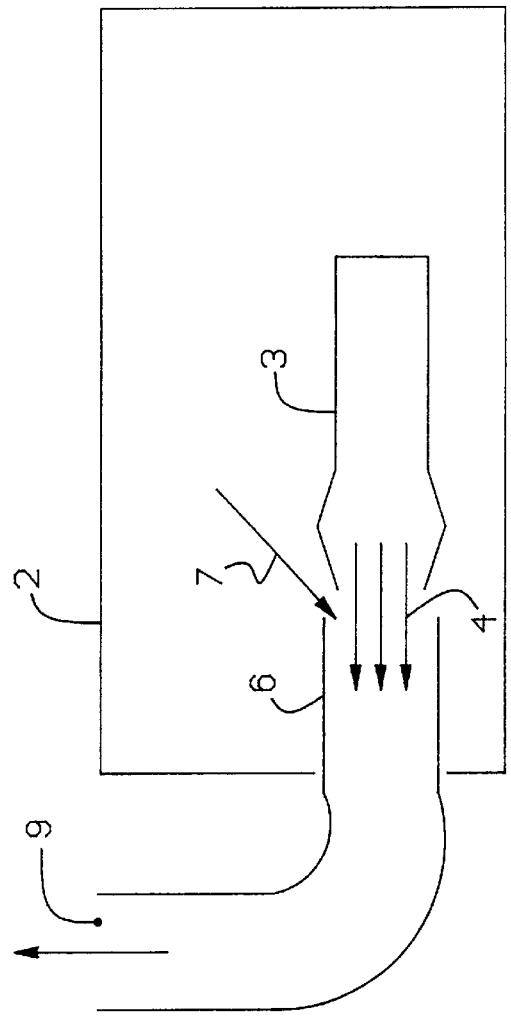
FIG 3
FIG 4

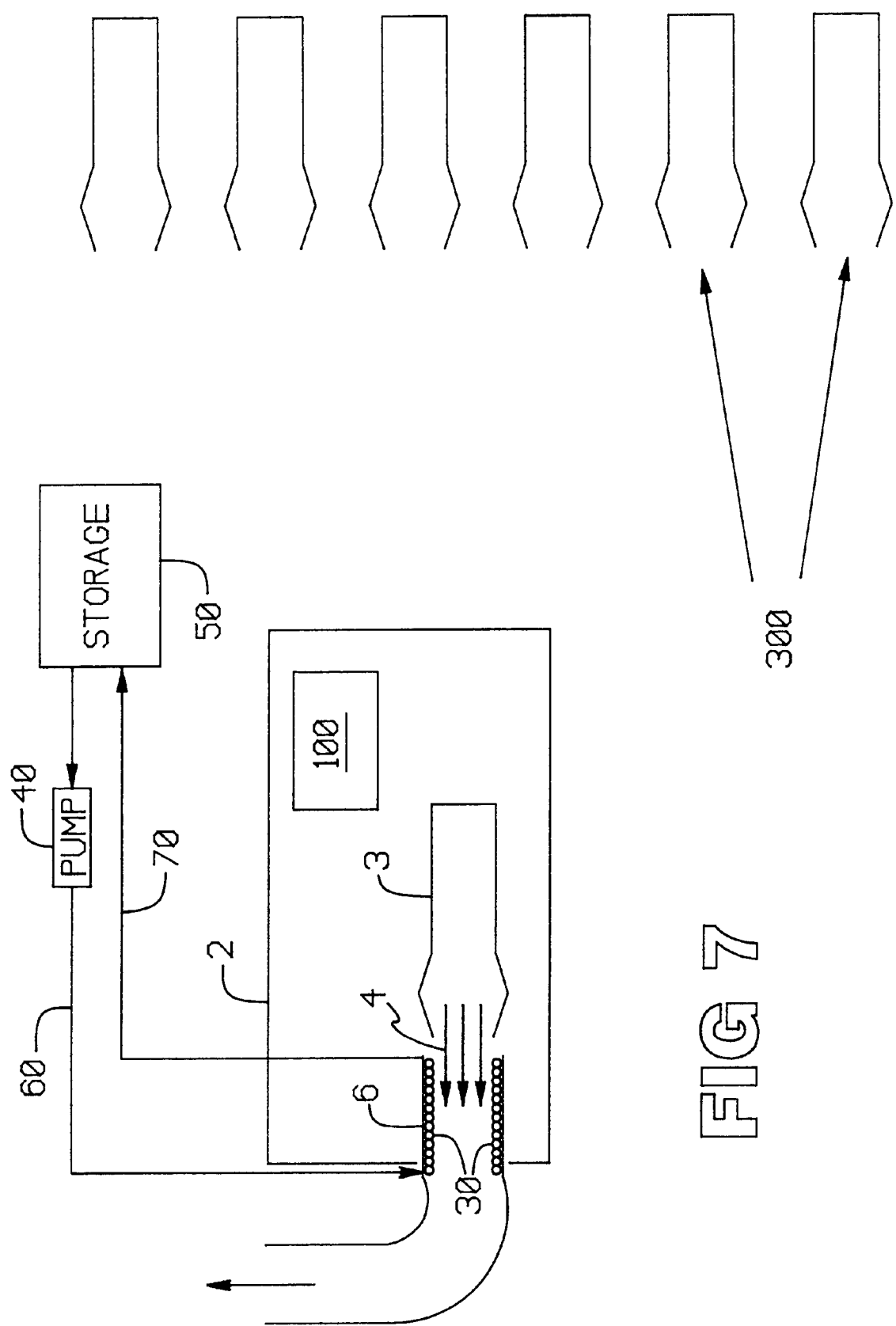

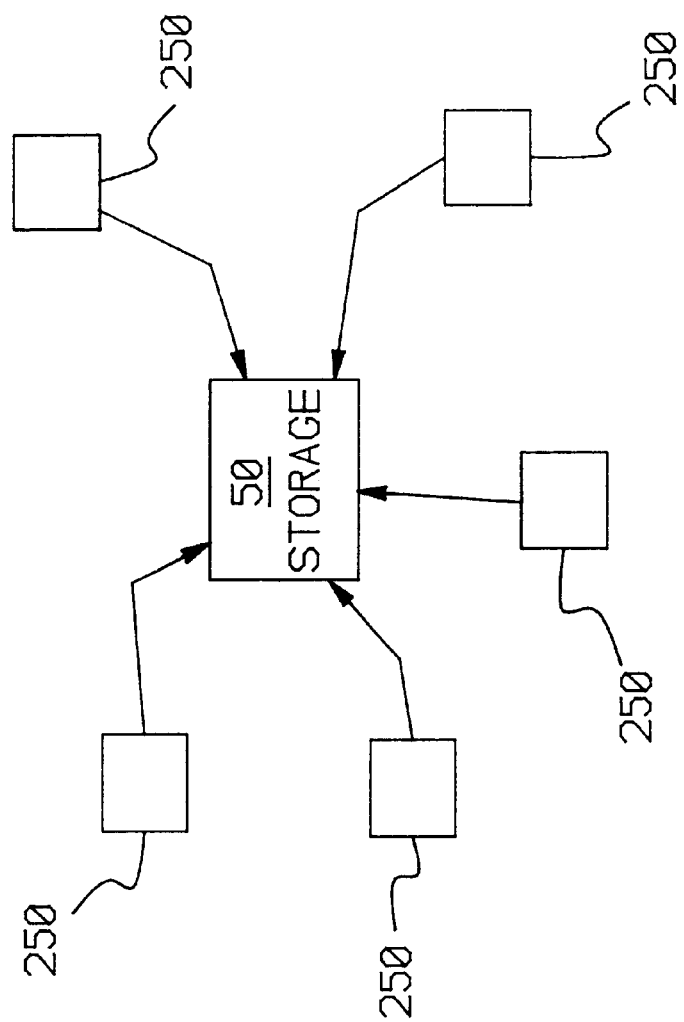
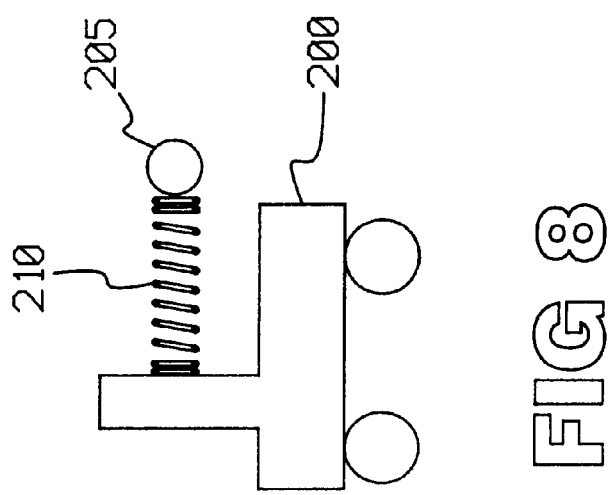

HEAT RECOVERY IN TEST CELLS FOR GAS TURBINE ENGINES

TECHNICAL FIELD

The invention concerns testing of gas turbine engines and, more specifically, recovery of heat which is ordinarily wasted in the testing process. The invention particularly concerns recovery of waste heat without interfering with the exhaust of an engine under test. Such interference is to be avoided because it can produce undesired back-pressure in the exhaust.

BACKGROUND OF THE INVENTION

Gas turbine engines, such as those used in aircraft and naval vessels, are tested in ground-based centers called test cells, which are generally, but not always, located at the site where the engines are manufactured.

Engines under development are tested during various stages of the development process: a single prototype can be tested multiple times. Also, once an engine design is fully developed, each individual engine manufactured according to that design can be tested after its completion.

The testing process consumes large amounts of jet fuel, representing a large consumption of energy. A simple example will illustrate the amounts of fuel involved.

In the gas turbine art, specific fuel consumption is defined as the amount of fuel consumed per hour in order to develop one pound of thrust. Engines producing thrust of 40,000 pounds are commonly produced, although engines producing higher and lower thrusts are available. An engine in the 40,000 pound class would thus consume 40,000×0.25, or 10,000 pounds of fuel per hour. Since jet fuel weighs roughly 6 pounds per gallon, 10,000 pounds of fuel represents about 1,667 gallons.

Therefore, testing the engine in question at rated thrust for one hour consumes 1,667 gallons of fuel. By comparison, many automobiles consume around three to five gallons of gasoline per hour.

In addition, not all the energy contained in the fuel is converted by the gas turbine engine into mechanical work. Much is lost as heat. The approximate size of this loss will be considered.

The gas turbine engine is based on the Brayton, or Joule, cycle, which is characterized by constant-pressure combustion. Efficiency is defined as (net work output)/(heat supplied). For an ideal Brayton cycle, the cycle efficiency can be shown to be $$\text{Efficiency} = 1 - (1/r)^{**[(\text{gamma}-1)/\text{gamma}]}$$

wherein r is the pressure ratio, gamma is the ratio Cp/Cv, namely, constant-pressure heat capacity to constant-volume heat capacity, Cv, of the working fluid, and the dual asterisks, **, represent exponentiation.

FIG. 1 illustrates efficiency plotted for a gamma of 1.4, which is the gamma of air. Clearly, a theoretical maximum efficiency is less than sixty percent for the pressure ratios shown.

At this assumed efficiency, only 60 percent of the heat content of the fuel is utilized to produce mechanical work. The rest is lost as waste heat. The invention proposes stratagems to recover this wasted heat.

SUMMARY OF THE INVENTION

In one form of the invention, waste heat produced in the testing process of a gas turbine engine is recovered. As a specific example, in test cells, exhaust from the engine is ducted to the atmosphere through exhaust pipes. Water is applied to the exhaust pipes, to prevent them from being damaged by the heat of the exhaust. This water turns to steam, and is vented to the atmosphere.

In one form of the invention, water tubes are wrapped around, or within, the exhaust pipes. Heat is extracted from the heated water within the tubes and stored.

BRIEF DESCRIPTION OF THE DRAWINGS

FIG. 1 illustrates a plot of theoretical efficiency of the Brayton Cycle.

FIG. 2 illustrates a test cell 2 as found in the prior art, and used to test gas turbine engines.

FIGS. 3 and 4 illustrate one form of the invention, in the form of tubes 30 in thermal contact with the pipe 6 of FIG. 2.

FIGS. 5, 6, and 7 illustrate several forms of the invention,

FIG. 8 illustrates a wheeled vehicle 200 using a spring 210 to eject a mass 205, to obtain thrust.

FIG. 9 illustrates one form of the invention.

DETAILED DESCRIPTION OF THE INVENTION

Figure 6:
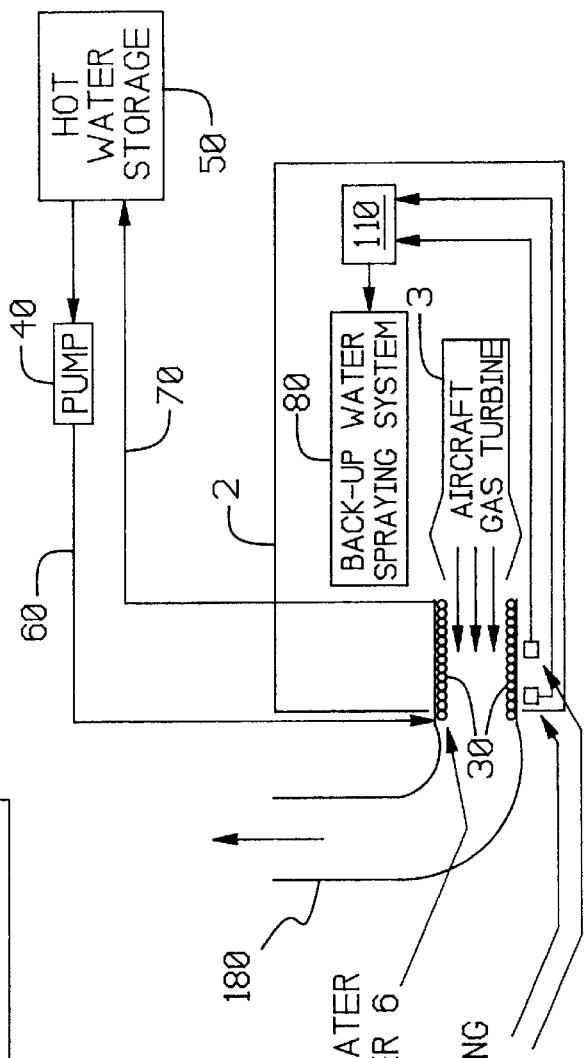

FIG. 2 illustrates a prior-art test cell 2. A gas turbine engine 3 delivers hot exhaust 4 to an exhaust pipe 6, which directs the exhaust to the atmosphere, at point 9. To prevent the exhaust pipe 6 from being damaged by the heat of the exhaust 4, water 7 is applied, as by spraying into the exhaust 4, or by being passively drawn into the exhaust 4. This water 7 is converted into steam, which is vented to the atmosphere.

FIG. 3 illustrates one form of the invention. Tubes 30 are wrapped around the exhaust pipe 6. The tubes 30 may also be wrapped around the inside of the exhaust pipe 6 as in FIG. 4. If so, it is important that the tubes 30 not interfere with the exhaust 4, and thereby apply back-pressure to the engine 3 of FIG. 2.

Interference will be largely eliminated if the diameter of the tubes 30 is about one to five percent of the diameter of the exhaust pipe 6, the tubes 30 lie adjacent the wall 33 of the exhaust pipe 6, and adjacent to each other. Under this arrangement, the tubes 30, in effect, form the exhaust pipe 6, and the exhaust 4 sees only a scalloped, or corrugated, surface, comprising the half-diameters of adjacent tubes.

Figure 5:
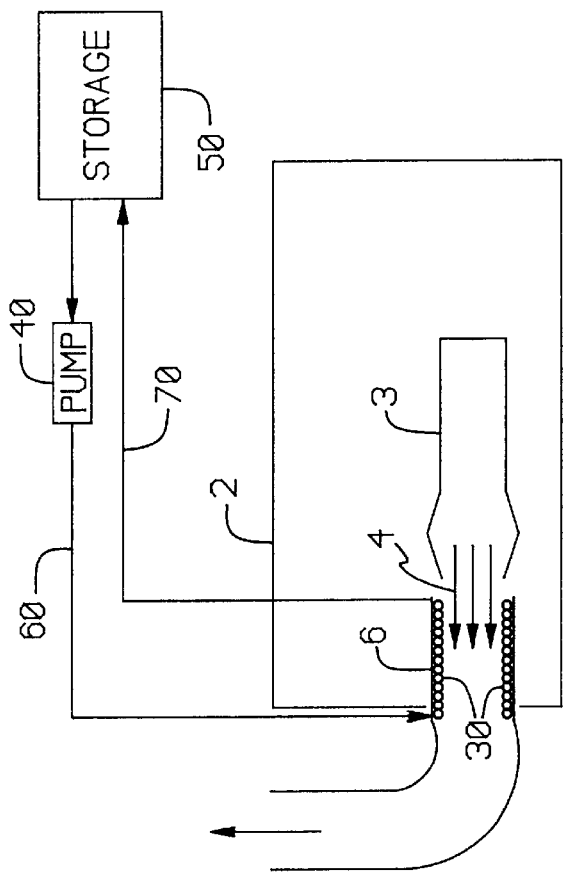

Water 33, or other coolant, is pumped through the tubes 30 by a pump 40 in FIG. 5. The heated water is delivered to a storage facility 50, through pipe 70, wherein heat is recovered. Such storage facilities are known in the art. The water is then returned to the tubes 30, through tube 60.

FIG. 5 illustrates counter-current heat exchange: pipe 60, containing cool water, is delivered at the cool end of the exhaust 4, while hotter water is contained in pipe 70, which is adjacent the hottest exhaust 4. A parallel-current approach is possible, wherein the cool water enters the pipes 30 through pipe 70. In some instances, the parallel approach may be preferred.

In one form of the invention, the prior-art water cooling system, which generates the steam described above, is maintained along with the invention. The prior-art system acts as a back-up, in case a failure should occur in the invention.

FIG. 6 represents the situation. Block 80 represents the prior-art system. One or more temperature sensors 100 sense temperature in the exhaust pipe 6, and deliver signals representing the temperatures sensed to a control 110. The control 110 compares the sensed temperatures to a reference and, if the sensed temperatures indicate that (1) an over-temperature condition is occurring, or imminent or (2) other danger to the exhaust pipe 6 is imminent, then the control 110 activates the prior art water cooling system 80. The system 80 then injects water 7 into the exhaust 4, as in FIG. 2. At this time, the control 110 may, or may not, de-activate the invention, such as by terminating operation of pump 40 in FIG. 5.

A minimal estimate of the amount of heat available for recovery can be obtained from the amount of water which is converted into steam using the prior art system of FIG. 2. Assume that city water is used, and that it enters the system at 62 degrees F. The specific heat of water is 0.998 Btu/(lbm–deg F), and the latent heat of vaporization is 970 Btu/lbm.

Thus, to raise one pound of water from 62 degrees to 212 degrees F., that is, by 150 degrees F., requires about 150 Btu. To convert that one pound of water to steam at 212 degrees requires 970 Btu, for a total of 970+150, or 1120, Btu per pound, to convert city water into steam.

One may assume a flow rate of water of five gallons per minute, or about 40 pounds per minute. Therefore, the amount of energy lost in the system of FIG. 2, by the water which is converted into steam, is 40×1120, or 44,800 Btu per minute. This corresponds to about 2.7 million Btu per hour. As a frame of reference, it is pointed out that many residential furnaces are rated at 100,000 Btu per hour. Consequently, under the assumptions made above, the system of FIG. 2 discards 27 times the energy of such a furnace.

If the invention operates at even 25 percent efficiency, it will collect about 11,000 Btu per minute, or 660,000 Btu per hour, of otherwise wasted heat.

The collected heat can be used (1) to heat buildings, (2) to heat water for use in buildings, and (3) other purposes similar to those to which solar collectors are applied.

If the water collected is sufficiently hot that it would turn to steam if released, that water can be piped into a tank of cooler water, thereby raising the temperature of the latter, and cooling the former, to produce a total body of water at a manageable temperature.

Alternately, the steam can be ducted through a turbine, to generate mechanical energy. As another alternate, if the water is not sufficiently hot, it can be used to vaporize a lower-boiling-point material, which is then ducted to a turbine.

In addition, the heat collected can be applied to thermo-electrics to generate electrical current. Thermo-electrics are similar to photo-electrics in the respect that, in both, external energy in both is used to promote carriers from the valence band in a semiconductor into the conduction band. In photo-electrics, the energy takes the form of photons. In thermo-electrics, the energy takes the form of heat, which is mechanical vibration, which generates phonons in the semiconductor.

One significant feature of the invention lies in a distinction over a certain apparatus in the prior art. Co-generation systems are available, wherein various approaches are taken to extract usable energy from exhaust gases of a gas turbine engine. However, in one form of the invention, the heat recovery system is installed in a given test cell, as in FIG. 7. Different engines 300 are sequentially installed in the test cell, and waste heat is recovered from each, as it is tested.

In contrast, in the prior art, a single engine is used. Even if a group of engines is used, the same group is used continuously. Stated another way, in the prior art co-generation systems, engines slated for test prior to delivery to a customer are not believed to be tested in a test cell wherein heat is recovered from the exhaust.

Another distinction lies in the fact that earth-based gas turbine engines used to generate electricity are designed to produce torque, or shaft power, for driving electrical generators. Such engines are designed to extract the maximum possible amount of energy from the output of the combustor of the engine, subject to energy extraction for other purposes, such as driving the compressor and overcoming losses.

Consequently, it is desired that no moving exhaust gases be expelled into the atmosphere, because the moving gases represent kinetic energy which has not been captured. Of course, some moving gas is, in fact, expelled. But that expulsion results from engineering compromises, and also thermodynamic considerations.

For example, a low-speed turbine could be provided to recover energy from the residual exhaust which is expelled into the atmosphere. However, the amount of energy recovered, compared with the cost of fabrication and maintenance of such a turbine, does not in general justify the expense of the turbine. Also, the Second Law of Thermodynamics states that, in order to extract energy from a turbine, some waste heat must necessarily be rejected to a sink. Thus, 100 percent efficiency is not possible.

Therefore, gas turbine engines designed to produce shaft work, such as powering an electrical generator, are designed to expel a minimum amount of moving exhaust into the atmosphere. That moving exhaust required fuel to produced it, which represents a cost, and contains kinetic energy and momentum, which is lost.

However, in a gas turbine engine designed to produce thrust, as in an aircraft, the situation, in general, is different. To illustrate basic principles of thrust production, assume a generalized wheeled vehicle 200 such as that shown in FIG. 8. That vehicle 200 propels itself by ejecting mass 205, using a spring 210.

A human operator, not shown, compresses the spring 210, places the mass 205, such as a bowling ball, on the spring, and uses the spring to eject the mass 205. Under Newton's Laws, the force applied by the spring 210 to eject the mass 205 applies an equal, but opposite, thrust force to the vehicle 200.

As another example, the vehicle can contain a tank of compressed air, not shown. The operator connects the tank to a nozzle, not shown, and ejects air. Again, a thrust force is applied to the vehicle 200.

In both examples, the magnitude of the thrust force equals the amount of momentum, per second, ejected from the vehicle 200. For example, assume that the bowling ball, weighing sixteen pounds, is ejected at a speed of 20 feet per second. The momentum, mv, is 16×20, or 320 foot-pounds/second. If two bowling balls are ejected every second, then a continual force of thrust of 320×2 foot-pounds/second×second, or 640 foot-pounds/second-squared, is generated.

A similar computation applies to ejection of the compressed air.

Therefore, a gas turbine engine, when used to produce jet thrust, obtains the jet thrust by ejecting moving gas. The amount of the thrust equals the amount of momentum ejected per second. Consequently, unlike the gas turbine engine used to produce shaft work, which is designed to eject minimal moving gas, the gas turbine engine designed to produce jet thrust is designed to eject maximal momentum per second.

Thus, the two types of engine are completely opposite in this respect. This fact indicates that cogeneration, which is used in gas turbine engines designed to produce shaft work, is not necessarily applicable or relevant to the invention, if applied to gas turbine engines designed to produce jet thrust.

Stating this another way, a designer would not, in general, use a gas turbine aircraft engine in a cogeneration facility. That engine is designed to eject maximal momentum per second. If it were used to drive an electrical generator, the losses involved would be enormous. A designer would not use it.

Of course, such an engine could be re-designed and adapted to the cogeneration facility, but, in such a case, the engine would no longer be classified as an aircraft engine.

Stated yet another way, in the test cell 2, the invention tests engines which produce thrust. Significant amounts of thrust are involved. While different engines produce different amounts of thrust, the invention specifically contemplates integral amounts of thrust from 5,000 pounds to 100,000 pounds and above. That is, the invention contemplates engines in the 5,000 pound thrust class, 6,000 pound class, 7,000 pound class, and so on, up to and exceeding 100,000 pounds.

The invention recovers heat from both types of engines: those designed to produce shaft work and those designed to produce jet thrust. In addition, in one form of the invention, gas turbine aircraft engines, which are designed to thrust, are used exclusively by the invention.

A significant feature is that aircraft engines are used by one form of the invention in the test cell. Such aircraft engines deliver massive amounts of exhaust. This exhaust is required to be vented to atmosphere through vertical stacks, represented by stack 180 in FIG. 6. Many such stacks terminate at a height of 40 feet, or more, above the ground.

FIG. 9 illustrates another form of the invention. Multiple heat-recovering cells, such as those represented in FIGS. 5 or 6, are provided, and indicated by blocks 250 in FIG. 9. Those heat-recovery cells 250 store heat in a common storage facility 50. That is, an individual facility is not provided for each block 250, but a common storage facility 50 is shared.

Numerous substitutions and modifications can be undertaken without departing from the true spirit and scope of the invention. What is desired to be secured by Letters Patent is the invention as defined in the following claims.

What is claimed is:

1. A method comprising:
    a) place an aircraft gas turbine engine into a test cell;
    b) running the engine, and ducting exhaust through an exhaust pipe;
    c) transferring heat from the exhaust in the exhaust pipe to a liquid coolant circulating through a closed circuit-circuit and pipe; and
    d) repeating steps (a), (b), and (c), each repetition done with a different engine.

2. Method according to claim 1, wherein the gas turbine engine is of the type which produces jet thrust in an aircraft.

3. A method, comprising:
    a) running an aircraft gas turbine engine in a test cell and ducting exhaust through an exhaust pipe;
    b) maintaining a water-spray cooling system in readiness to cool the exhaust pipe; and
    c) transferring heat from the exhaust to a liquid coolant separate from the water-spray cooling system.

4. Method according to claim 3, and further comprising:
    d) sensing temperature of the exhaust pipe at one or more locations;
    e) if one or more sensed temperatures exceed a threshold, actuating the water-spray cooling system.

5. Method according to claim 3, and further comprising:
    d) storing heat contained in said liquid coolant.

6. Method according to claim 3, and further comprising:
    d) actuating the water-spray cooling system.

7. Method according to claim 5, and further comprising:
    e) making a determination as to whether engine exhaust presents a danger to the exhaust pipe and, if so, actuating the water-spray cooling system.

8. Method according to claim 3, wherein the gas turbine engine is of the type which produces jet thrust in an aircraft.

9. Apparatus, comprising:
    a) a test cell having an exhaust pipe for receiving exhaust gases from an aircraft
    a) air gas turbine,
    b) closed circuit tubing which
        i) contains liquid coolant,
        ii) is in thermal contact with the exhaust pipe, and
        iii) is effective to extract over one million Btu's per hour from exhaust in the exhaust pipe.

10. Apparatus according to claim 9, and further comprising:
    c) means for storing heat extracted.

11. Apparatus, comprising:
    a) a test cell having an exhaust pipe for receiving exhaust gases from an aircraft gas tube
    b) liquid-filled closed circuit conduit in thermal contact with the exhaust gases;
    c) a heat storage system; and
    d) a pump for pumping the liquid between the heat storage system and the tubing.

12. Apparatus according to claim 11, and further comprising:
    e) a back-up cooling system comprising a water spray for cooling the exhaust pipe;
    f) a sensor for ascertaining temperature of the exhaust pipe; and
    g) a control coupled to the sensor and the back-up cooling system, which actuates the back-up cooling system when the ascertained temperature exceeds a limit.

13. Method according to claim 2, wherein the engine produces thrust exceeding 5,000 pounds during the test.

14. Method according to claim 8, wherein the engine produces thrust exceeding 5,000 pounds during the test.

* * * * *